Oct. 13, 1953     T. J. SOROKA     2,655,389
FENDER SHIELD
Filed May 24, 1951                                                    2 Sheets-Sheet 1
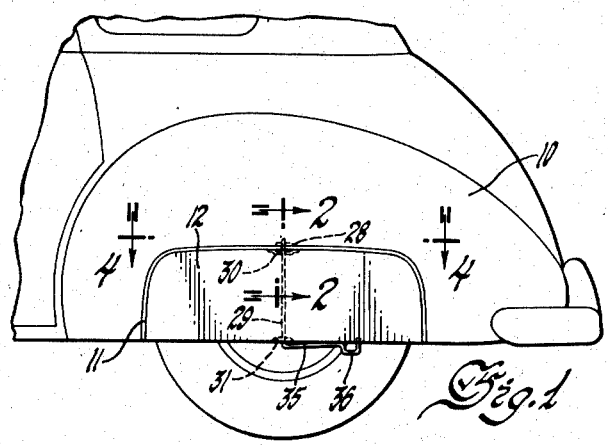
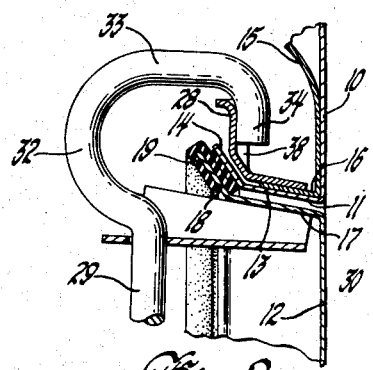
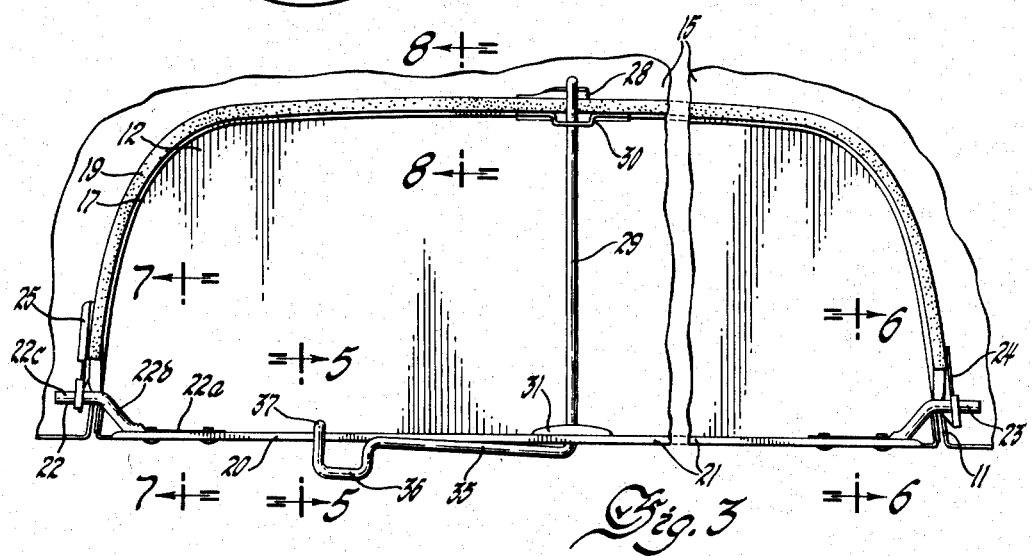
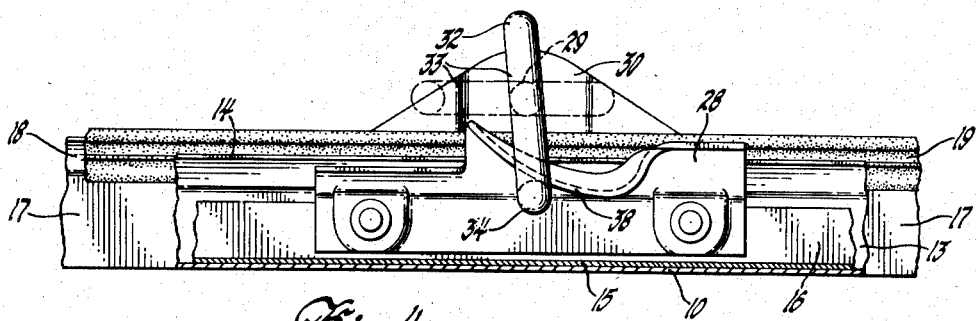
Inventor
Theodore J. Soroka
By Willito, Helwig & Baillio
Attorneys Oct. 13, 1953  T. J. SOROKA  2,655,389
FENDER SHIELD Filed May 24, 1951  2 Sheets-Sheet 2

Inventor
Theodore J. Soroka
By Willito, Helwig & Baillio
Attorneys

Patented Oct. 13, 1953

2,655,389

UNITED STATES PATENT OFFICE 2,655,389

FENDER SHIELD

Theodore J. Soroka, Indianapolis, Ind., assignor to General Motors Corporation, Detroit, Mich., a corporation of Delaware Application May 24, 1951, Serial No. 228,056

11 Claims. (Cl. 280—153)

This invention relates to improvements in fender shields. In particular, this device pertains to novel means for mounting and locking such shield to a vehicle fender.

In an effort to further streamline the appearance of automobiles, coverings or shields have been made to enclose part of the wheel openings in the fenders. In order to make vehicle wheels accessible for repair or removal when employing such a shield, the shield must itself be readily removable. The difficulty in making a satisfactory fender shield resides in constructing one which is easily removable and yet is secure when in place. While fender shields have been built which are satisfactory when inserted in the wheel opening, usually the difficulty attending their ready insertion and removal coupled with a lack of rigidity when in place has precluded their general utility.

It is an object of the present invention to provide a fender shield supporting and latching device which is simple of construction and expeditious in operation. It is a further object to provide a positively acting latching or locking mechanism which will insure an intimate juncture between said fender and shield. It is also an object of the invention to provide a novel latching means mounted on a fender shield for simultaneously locking said shield to the fender and the means itself to the shield. Still another object is to provide supporting and latching means which simultaneously moves the shield laterally and downwardly, which compound movement enables the shield to be held in position more securely than has hitherto been possible. It is also an object to provide resilient supporting means which react to the motion of the shield, during the latter's engagement with the fender, to provide a supplemental force urging the shield into engagement with the fender.

Certain other advantages will appear by reading the detailed description of parts and the operative relations thereof which follows.

Figure 1 is a rear quarter view of a vehicle showing a fender and shield assembly.

Figure 2 is a fragmentary vertical sectional view along line 2—2 of Figure 1, showing the construction of the fender and shield flanges, a latch and the configuration of the upper portion of a latching means.

Figure 3 is an inside view of the fender and skirt assembly showing the disposition and relation of parts.

Figure 4 is a fragmentary horizontal sectional view taken along line 4—4 of Figure 1, showing the construction and operative relation of the latch and latching means assembly.

Figure 5:
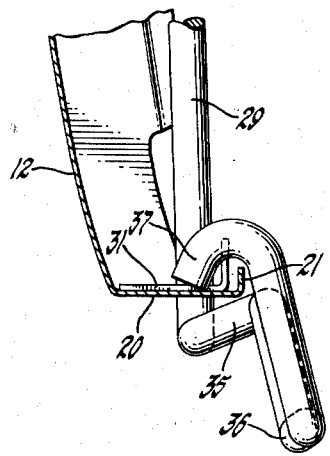
Figure 5 is a fragmentary vertical sectional view taken along the line 5—5 of Figure 3 illustrating the construction of a means for locking the latching means to the shield.
Figure 6:
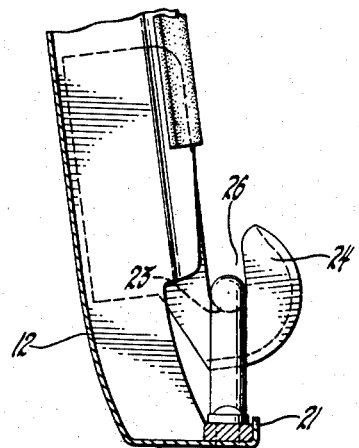
Figure 7:
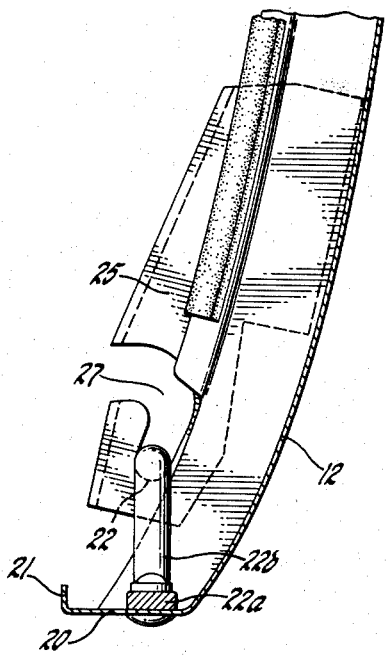

Figures 6 and 7 are fragmentary vertical sections along lines 6—6 and 7—7 of Figure 3, showing the construction and coaction of the fender and shield supporting members.

Figure 8:
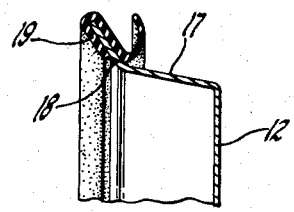

Figure 8 is a fragmentary sectional view of the shield taken along the line 8—8 of Figure 3 showing the construction and location of a gasket member.

Referring particularly to the drawings, Figure 1 is a view of the rear quarter of a vehicle with a fender shield in its assembled position. A fender 10 has a wheel opening 11 in the outer wall thereof and which opening is removably covered by a shield 12. As will be seen in Figures 2 and 3, fender 10 has an inwardly and slightly upwardly extending flange member 13 extending about the fender opening 11. The inner edge 14 of flange 13 is inclined upwardly. Fender 10 is mounted upon and secured to a wheel housing 15 which has an inwardly disposed flange member 16 lying within the flange member 13.

Projecting inwardly from the outer surface of the shield 12 is a flange member 17. The inner edge 18 of flange 17 is inclined upwardly. Flange 17 is substantially parallel to flange 13. The edge 18 is adapted to receive a gasket 19 which abuts against the edge 14 of flange 13 when the shield is assembled to the fender.

As seen in Figures 3 and 5 through 7, shield 12 has a second inwardly disposed member 20 which extends across the bottom portion of said shield. Flange 20 has a vertically upstanding portion 21 projecting from the inner end thereof. Respectively secured to the ends of flange 20 are trunnion members 22 and 23 which are adapted to support the shield 12 for rotary motion. Since the structure of each trunnion is identical, only one need be described. Trunnion 22 is formed so as to have a flat horizontal portion 22a adapted to be secured to the flange 20, an upwardly inclined portion 22b and a second horizontal portion 22c which projects beyond the shield 12 and is adapted to coact with supporting means associated with the fender. By upwardly spacing the free end 22c of the trunnion, the axis of rotation of the shield is above the lower edge of the fender, thus enabling the trunnions and their supporting members to be removed from sight.

Respectively secured to the side portions of fender flange 13 are supporting brackets 24 and 25. Bracket 24, as seen in Figure 6, has a vertically inclined slot 26 open at the top and adapted to vertically receive trunnion 23. As shown in Figure 7, bracket 25 has a downwardly inclined slot 27 open at the side to receive trunnion 22. It is apparent that the trunnions may be rotated as well as translated vertically within their respective brackets.

In order to provide means for locking the shield 12 in its ultimate position covering the wheel opening 11, a fastening mechanism is provided comprising a latch 28 secured within the upper portion of fender flange 13 and a locking member 29 secured to the shield 12. The various aspects of this mechanism can best be understood by referring to Figures 2 through 5. The member 29 is generally L-shaped and is supported for rotary motion only on shield 12 by a pair of vertically aligned apertured guides 30 and 31. Guide 30 is secured to the underside of flange 17, while guide 31 is fastened to the inside of flange 20. The latch 28 and guides 30 and 31 are in substantial vertical alignment. Referring to Figure 2, the upper portion of member 29 has an arcuate portion 32 having a free end 33 which extends inwardly toward fender 10 and which terminates in a depending portion 34 substantially parallel to the vertical axis of member 29. The lower portion of member 29 consists of an arm 35 extending angularly to the vertical axis of member 29. The arm 35 has a depending U-shaped element 36 formed therein. The free end of element 36 has a downwardly inclined appendage 37 projecting therefrom in a plane substantially perpendicular to the plane of said U-shaped element. The appendage 37 is adapted to overlie the vertical lip 21 of flange 20, thereby locking the member 29 against rotary motion.

Latch 28 has the dual functions of being a camming, or motion producing, device as well as a means against which the shield may be locked to prevent rotary motion thereof. As best seen in Figure 4, latch 28 has a horizontal curvature 38, which is instrumental in insuring a locking movement that will result in a rigid connection of the shield to the fender.

The operation of latch 28 and locking member 29 will be best understood by considering the entire assembling of the shield to the fender. Shield 12 is placed wholly inside fender 10 with trunnions 22 and 23 being inserted in their respective brackets 24 and 25. The shield is then rotated outwardly toward the fender so as to bring the shield into touching engagement with the fender. Assuming arm 35 to be in its unlocked position beyond the outer surface of shield 12, said arm is rotated inwardly toward the vehicle, thereby causing portion 34 of the locking member 29 to engage with latch 28. As may be seen in Figures 2, 4 and 5, as arm 35 is rotated counterclockwise portion 34 of member 29 follows the curvature 38 of latch 28, thus drawing the gasketed flange edge 18 into engagement with fender flange edge 14. Due to their inclined constructions, edge 18 tends to slide downwardly and outwardly on edge 14 while being drawn thereagainst by the action of the fastening mechanism as described. The downward component of the resultant movement of shield 12 places the trunnions 22 and 23 under a bending stress such that they urge the shield upwardly in tending to straighten out, thus forcing the flanges more intimately together. The rotation of arm 35 is continued until it has passed within the wheel housing at which time the arm is forced upwardly until appendage 37 overlies the lip 21 on flange 20, thereby locking the arm against further rotation.

This novel supporting and locking mechanism produces a compound engaging action which is the resultant of the horizontal and vertical forces created by the locking mechanism and trunnions, as described, which insures a maximum securing effort along all fender and shield mating surfaces and an accompanying rigid assembly.

From the foregoing it will be seen that there is provided herein an improved type of retaining means for detachably securing a fender shield to a fender.

While a specific embodiment of the invention is depicted, it is not intended to limit my invention thereto inasmuch as it is apparent that minor structural changes may be made within the scope of my invention.

I claim:

1. In a fender closure device for a vehicle fender having a wheel opening therein, a shield for closing said opening, an inwardly extending flange formed on said fender, a latch secured within said flange and spaced from said fender, a supporting member secured to said flange at each side of said wheel opening, a first inwardly projecting flange formed on said shield, a second inwardly projecting flange formed on said shield, a guide member secured to said first flange, a guide member secured to said second flange and in substantial vertical alignment with said first-mentioned guide member, a trunnion member at each end of said second flange, said trunnions being supported within said supporting members respectively and capable of rotary motion with respect thereto, a locking member supported by said guide members, a portion of said locking member being adapted to engage said latch within the space defined by said latch and said fender, and means carried by said locking member for locking said member to said shield.

2. In a supporting and latching means for detachably securing a fender shield to a fender over a wheel opening therein including, a pair of trunnion members secured to the lower portion of said shield and projecting therebeyond, a pair of brackets secured to said fender, said brackets being adapted to respectively receive and rotatably support said trunnion members, a pair of spaced guide members attached to said shield, a latch fixed to said fender, said guide members and said latch being in substantial vertical alignment, a locking element supported for rotational movement only by said guide members, said element being adapted to engage and lock with said latch and means associated with said element for locking the latch to said shield.

3. In a supporting and latching means for detachably securing a fender shield to a fender over a wheel opening therein including, a pair of trunnion members secured to said shield and projecting therebeyond, a pair of brackets secured to said fender, said brackets being adapted to respectively receive and rotatably support said trunnion members, a pair of spaced guide members attached to said shield, a latch having a cam surface formed thereon fixed to said fender, a locking element, said locking element having a main portion disposed between said guide members, an arcuate portion disposed above the upper guide member and terminating in a depending portion, said depending portion being adapted to coact with the cam surface of said latch to lock said shield to the fender, said locking member further having a portion below the lower guide member and angularly disposed to said main portion, said angularly disposed portion having means at the end thereof for locking the latching means to said shield.

4. In a fender closure device of the type wherein a fender shield is adapted to partially enclose a wheel opening in a fender, the combination with said shield of a locking member secured thereto, a pair of trunnion members secured to said shield, a pair of brackets secured to said fender for respectively supporting said trunnions, a flange formed on said fender, a latch secured within said flange, a flange formed on said shield, said locking member being adapted to rotatably engage said latch thereby moving said shield flange laterally into engagement with said fender flange, said shield flange being adapted to coact with said fender flange during the lateral engagement therewith to move said shield downwardly, the downward movement of said shield being resiliently opposed by said trunnions whereby the shield is urged upwardly into engagement with said fender with a force proportional to the lateral movement of said shield flange.

5. In a supporting and latching means for detachably securing a fender shield to a fender over a wheel opening therein including, a pair of trunnion members secured to the lower portion of said shield and projecting therebeyond, a pair of brackets secured to said fender, said brackets being adapted to respectively receive and rotatably support said trunnions, a flange projecting inwardly and upwardly from the outer surface of said fender, a latch secured within said flange, a flange projecting inwardly and upwardly from the outer surface of said shield, said shield flange being substantially parallel to said fender flange and being adapted to abut thereagainst, a locking means secured to said shield, said locking means being adapted to rotatably engage said latch thereby moving said shield flange laterally into engagement with said fender flange, said shield flange being adapted to slide downwardly on said fender flange during the lateral engagement therewith thereby forcing said shield downwardly, the downward movement of said shield being resiliently opposed by said trunnion members whereby the shield is urged upwardly into engagement with the fender with a force proportional to said sliding movement.

6. A supporting and latching mechanism for detachably securing a fender shield to a fender over a wheel opening therein including in combination, a pair of trunnion members secured to the lower portion of said shield and projecting therebeyond, a pair of brackets secured to said fender, said brackets being adapted to respectively receive and rotatably support said trunnion members, a pair of spaced guide members attached to said shield, a latch fixed to said fender, said latch having a horizontal cam surface, a locking element supported for rotational movement by said guide members, said element being adapted to rotatably engage said cam surface, the relative movement of said element over said cam surface being adapted to rotate said shield into engagement with said fender, and means associated with said element for locking the latter to said shield.

7. In a supporting and latching means for detachably securing a fender shield to a fender over a wheel opening therein including, a pair of trunnion members secured to the lower portion of the shield and projecting therebeyond, a pair of brackets secured to said fender, said brackets being adapted to respectively receive and rotatably support said trunnions, a flange projecting inwardly and upwardly from the outer surface of said fender, a latch secured within said flange, a flange projecting inwardly and upwardly from the outer surface of said shield, said shield flange being substantially parallel to said fender flange and being adapted to abut thereagainst, a pair of spaced guide members attached to said shield, a locking element supported by said guide members, said locking element having a main portion disposed between said guide members, an arcuate portion disposed above the upper guide member and terminating in a depending portion, said depending portion being adapted to rotatably engage said latch thereby moving said shield flange laterally into engagement with said fender flange, said shield flange being adapted to slide downwardly on said fender flange during the lateral engagement therewith thereby forcing said shield downwardly, the downward movement of said shield being resiliently opposed by said trunnion members whereby the shield is urged upwardly into engagement with the fender with a force proportional to said sliding movement.

8. In a supporting and latching means for detachably securing a fender shield to a fender over a wheel opening therein including, a pair of trunnion members secured to the lower portion of the shield and projecting therebeyond, a pair of brackets secured to said fender, said brackets being adapted to respectively receive and rotatably support said trunnions, a flange projecting inwardly and upwardly from the outer surface of said fender, a latch secured within said flange, said latch having a horizontal cam surface formed thereon, a flange projecting inwardly and upwardly from the outer surface of said shield, said shield flange being substantially parallel to said fender flange and being adapted to abut thereagainst, a locking element secured to said shield, said locking element being adapted to rotatably engage said cam surface thereby moving said shield flange laterally into engagement with said fender flange, said shield flange being adapted to slide downwardly on said fender flange during the lateral engagement therewith thereby forcing said shield downwardly, the downward movement of said shield being resiliently opposed by said trunnion members whereby the shield is urged downwardly into engagement with the fender with a force proportional to said sliding movement.

9. In a supporting and latching means for detachably securing a fender shield to a fender over a wheel opening therein including, a pair of trunnion members secured to the lower portion of said shield and projecting therebeyond, a pair of brackets secured to said fender, said brackets being adapted to respectively receive and rotatably support said trunnions, a flange projecting inwardly and upwardly from the outer surface of said fender, a latch having a cam surface thereon secured within said flange, a flange projecting inwardly and upwardly from the outer surface of said shield, said shield flange being substantially parallel to said fender flange and being adapted to abut thereagainst, a pair of spaced guide members attached to said shield, a locking element supported by said guide members, said locking element having a main portion disposed between said guide members, an arcuate portion disposed above the upper guide member and terminating in a depending portion, said depending portion being adapted to rotatably engage the cam surface of said latch thereby moving said shield flange laterally into engagement with said fender flange at a rate determined by the curvature of said cam surface, said shield flange being adapted to slide downwardly on said fender flange during the lateral engagement therewith thereby forcing said shield downwardly, the downward movement of said shield being resiliently opposed by said trunnion members whereby the shield is urged upwardly into engagement with the fender with a force proportional to said sliding movement.

10. In a supporting and latching means for detachably securing a fender shield to a fender over a wheel opening therein including, a pair of trunnion members secured to the lower portion of said shield, each of said trunnion members having a horizontal portion secured to said shield, an upwardly inclined portion and an outwardly extending portion projecting beyond said shield, a pair of brackets secured to said fender, said brackets being adapted to respectively receive and rotatably support the outwardly extending portions of said trunnions, a flange projecting inwardly and upwardly from the outer surface of said fender, a latch secured within said flange, a flange projecting inwardly and upwardly from the outer surface of said shield, said shield flange being substantially parallel to said fender flange and being adapted to abut thereagainst, a locking means secured to said shield, said locking means being adapted to rotatably engage said latch thereby moving said shield flange laterally into engagement with said fender flange, said shield flange being adapted to slide downwardly on said fender flange during the lateral engagement therewith thereby forcing said shield downwardly, the downward movement of said shield being resiliently opposed by said trunnion members whereby the shield is urged upwardly into engagement with the fender with a force proportional to said sliding movement.

11. In a supporting and latching means for detachably securing a fender shield to a fender over a wheel opening therein including, a pair of trunnion members secured to the lower portion of the shield and projecting therebeyond, a pair of brackets secured to said fender, said brackets being adapted to respectively receive and rotatably support said trunnions, a flange projecting inwardly and upwardly from the outer surface of said fender, a latch secured within said flange, a flange projecting inwardly and upwardly from the outer surface of said shield, said shield flange being substantially parallel to said fender flange and being adapted to abut thereagainst, a pair of spaced guide members attached to said shield, a locking element supported by said guide members, said locking element having a main portion disposed between said guide members, an arcuate portion disposed above the upper guide member and terminating in a depending portion, said depending portion being adapted to rotatably engage said latch thereby moving said shield flange laterally into engagement with said fender flange, said shield flange being adapted to slide downwardly on said fender flange during the lateral engagement therewith thereby forcing said shield downwardly, the downward movement of said shield being resiliently opposed by said trunnion members whereby the shield is urged upwardly into engagement with the fender with a force proportional to said sliding movement, said locking element further including a portion angularly disposed to said main portion below said lower guide member, said angularly disposed portion having a depending U-shaped segment extending therefrom, the free end of said segment having a downwardly curved portion projecting therefrom in a plane substantially perpendicular to the plane of said U-shaped portion, said downwardly curved portion being adapted to lock with said shield thereby preventing rotational movement of said locking element.

THEODORE J. SOROKA.

References Cited in the file of this patent

UNITED STATES PATENTS

| Number | Name | Date |
|---|---|---|
| 2,334,867 | Fergueson | Nov. 23, 1943 |
| 2,560,601 | Schatzman | July 17, 1951 |
| 2,567,971 | Schatzman | Sept. 18, 1951 |